United States Patent
Yin et al.

(10) Patent No.: US 12,517,737 B2
(45) Date of Patent: Jan. 6, 2026

(54) METHODS FOR DYNAMICALLY GENERATING GENERATIVE OPERATING SYSTEMS BASED ON HARDWARE AND SOFTWARE ENVIRONMENT FEATURE

(71) Applicant: ZHEJIANG UNIVERSITY, Zhejiang (CN)

(72) Inventors: Jianwei Yin, Hangzhou (CN); Xinkui Zhao, Hangzhou (CN); Shuiguang Deng, Hangzhou (CN); Peng Hu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 19/096,698

(22) Filed: Mar. 31, 2025

(65) Prior Publication Data
US 2025/0321753 A1  Oct. 16, 2025

Related U.S. Application Data

(63) Continuation-in-part of application No. PCT/CN2024/095132, filed on May 24, 2024.

(30) Foreign Application Priority Data

Apr. 10, 2024  (CN) .................... 202410429956.7

(51) Int. Cl.
*G06F 9/445* (2018.01)
*G06F 8/41* (2018.01)
*G06F 9/4401* (2018.01)

(52) U.S. Cl.
CPC .......... *G06F 9/44521* (2013.01); *G06F 8/443* (2013.01); *G06F 9/4406* (2013.01)

(58) Field of Classification Search
CPC .. G06F 9/45558; G06F 9/44521; G06F 8/443; G06F 9/4406
See application file for complete search history.

(56) References Cited

U.S. PATENT DOCUMENTS

| | | | | |
|---|---|---|---|---|
| 8,219,983 B1* | 7/2012 | Sobel | ......... | G06F 8/60 |
| | | | | 717/126 |
| 9,015,652 B2* | 4/2015 | Suenbuel | ......... | G06F 8/30 |
| | | | | 717/106 |

(Continued)

FOREIGN PATENT DOCUMENTS

| | | |
|---|---|---|
| CN | 114416031 A | 4/2022 |
| CN | 115495158 A | 12/2022 |

(Continued)

OTHER PUBLICATIONS

Reddit, aioeu's response on Jan. 26, 2022, URL: https://www.reddit.com/r/linux_programming/comments/sd09kg/is_it_possible_to_link_a_static_lib_a_to_a_shared/ (Year: 2022).*

(Continued)

*Primary Examiner* — Aimee Li
*Assistant Examiner* — Harrison Li
(74) *Attorney, Agent, or Firm* — PORUS IP LLC

(57) ABSTRACT

Embodiments of the present disclosure a method for dynamically generating a generative operating system based on a hardware and software environment feature, the method is configured to generate the generative operating system, and an architecture of the generative operating system includes: a hardware architecture adaptation layer and a meta kernel layer and an external library of the operating system. The method comprises: systematically and comprehensively perceiving an environment state and application requirements by an environment sensor and generating a configuration file; parsing the corresponding micro-libraries through the configuration files and obtaining a correspond- (Continued)

ing micro-libraries collection through a micro-library marketplace; assembling configured micro-libraries into the generative operating system by a system organizer; and dynamically adjusting and optimizing the generative operating system in real time by a run optimizer based on changes in a runtime environment and operational requirements.

18 Claims, 8 Drawing Sheets

(56) References Cited

U.S. PATENT DOCUMENTS

| | | | |
|---|---|---|---|
| 2003/0074487 A1* | 4/2003 | Akgul | G06F 8/656 |
| | | | 719/331 |
| 2004/0123188 A1* | 6/2004 | Srinivasan | G06F 11/2294 |
| | | | 714/E11.173 |
| 2017/0322815 A1 | 11/2017 | Buswell | |

FOREIGN PATENT DOCUMENTS

| | | |
|---|---|---|
| CN | 116931969 A | 10/2023 |
| CN | 117149298 A | 12/2023 |
| CN | 117176568 A | 12/2023 |
| RU | 2626350 C1 | 7/2017 |
| WO | 2021213293 A1 | 10/2021 |

OTHER PUBLICATIONS

Huang, Jun et al., A Context-Driven Architecture and the Supporting System for Internetware, Computer Engineering & Science, 32(7): 130-133&139, 2010.

International Search Report in PCT/CN2024/095132 mailed on Nov. 22, 2024, 7 pages.

Written Opinion in PCT/CN2024/095132 mailed on Nov. 22, 2024, 8 pages.

* cited by examiner

METHODS FOR DYNAMICALLY GENERATING GENERATIVE OPERATING SYSTEMS BASED ON HARDWARE AND SOFTWARE ENVIRONMENT FEATURE

CROSS-REFERENCE TO RELATED APPLICATIONS

This application is a continuation-in-part of international application No. PCT/CN2024/095132 filed on May 24, 2024, which claims priority to Chinese patent application No. 202410429956.7, filed on Apr. 10, 2024, the entire contents of which are incorporated herein by reference.

TECHNICAL FIELD

The present disclosure relates to a field of computer technology, and specifically relates to a method for dynamically generating a generative operating system based on a hardware and software environment feature.

BACKGROUND

A traditional process of generating an operating system usually adopts a static pre-development manner, which has fixed functions and structure of the operating system in a design and development stage and has certain advantages in terms of stability and ease of use. However, the traditional process of generating the operating system also suffers from insufficient flexibility, low functionality matching, and high cost of updating and maintenance. The operating system that is static pre-developed is usually unable to be customized according to the user's specific needs, making it difficult to adapt to changing application environments. At the same time, the user may face the problem of over-functioning or under-functioning, which leads to wasted resources or under-performance in specific application proposals. With the rapid development of new hardware and software technologies, the operating system that is static pre-developed is not able to efficiently match new requirements of the hardware and software environments, which leads to inadequate system performance.

Therefore, it is desired to provide a method for dynamically generating a generative operating system based on a hardware and software environment feature to generate a generative operating system, which enables the operating system to be highly flexible and provide a more personalized service to the user. the method in the present disclosure is able to meet the specific hardware device and software requirements more accurately, and adapt to the development of new types of hardware and software more quickly, which ensures a latest and best performance of the system.

SUMMARY

In order to overcome the above problems, embodiments of the present disclosure propose a method for dynamically generating a generative operating system based on a hardware and software environment feature. Different from traditional static pre-developed operating systems, the dynamic generative operating system is not pre-consolidated and completed, but is capable of being dynamically generated and adaptively optimized based on real-time hardware and software environments and user requirements.

Example embodiments of the present disclosure provide a method for dynamically generating a generative operating system based on a hardware and software environment feature, the method being configured to generate the generative operating system, wherein an architecture of the generative operating system includes: a hardware architecture adaptation layer and a meta kernel layer and external libraries of the operating system; the hardware architecture adaptation layer is configured to access a hardware and sense a feature of the hardware, and provide lifecycle management and hardware abstraction management to the meta kernel layer of the operating system; the meta kernel layer of the operating system is configured to realize a basic operating framework of the operating system, wherein the metal kernel layer includes a dynamic combination framework of micro-libraries and a dynamic updating architecture of the micro-libraries; the external libraries are micro-libraries implementations of functions required by the operating system other than the meta kernel layer, wherein the external libraries include programming language micro-libraries for supporting multiple languages and system management libraries for implementing various types of management strategies; the method comprises: first, systematically and comprehensively perceiving an environment state and application requirements by an environment sensor and generating a configuration file; secondly, parsing the corresponding micro-libraries through the configuration files and obtaining a corresponding micro-libraries collection through a micro-library marketplace; subsequently, assembling configured micro-libraries into the generative operating system by a system organizer; finally, dynamically adjusting and optimizing the generative operating system in real time by a run optimizer based on changes in a runtime environment and operational requirements; wherein the run optimizer focuses on performance optimization of runtime adaptation of the generative operating system, by sensing an upper layer application and a system self-update instruction through the environment sensor, a system configuration, dynamic updating of a micro-libraries version of the generative operating system, and runtime dynamic optimization of the generative operating system is achieved; the run optimizer includes an intelligent runtime sensor and a dynamic updater, wherein the intelligent runtime sensor monitors the micro-libraries through the generative operating system, captures a runtime state of the generative operating system in real time, and automatically performs system configuration tuning and micro-libraries updates in response to a change of the system configuration and requirements for the performance optimization; the dynamic updater is configured for adaptive real-time compilation and dynamic updating of the micro-libraries within the generative operating system, and a dynamic update mechanism allows the intelligent runtime sensor to dynamically load or unload the micro-libraries according to changing requirements.

BRIEF DESCRIPTION OF THE DRAWINGS

This specification will be further illustrated by way of exemplary embodiments, which will be described in detail by means of the accompanying drawings. The embodiments are not limiting, and in these embodiments, the same numbering denotes the same structure, wherein.

DETAILED DESCRIPTION

In order to make the purpose, technical solutions, and advantages of this specification clearer, specific embodiments of the present invention are described in detail below in conjunction with the accompanying drawings. Examples of these preferred embodiments are exemplified in the accompanying drawings. Examples of embodiments of the present invention shown in and described in accordance with the accompanying drawings are merely exemplary, and the present invention is not limited to these embodiments.

It is also noted herein that, in order to avoid blurring the present disclosure by unnecessary details, only structures and/or processing operations closely related to the embodiment according to the present disclosure are shown in the accompanying drawings, while omitting other details.

Embodiments of the present disclosure provide an adaptive generative operating system architecture based on an environment sensor, a system organizer, and a run optimizer, aiming to improve flexibility, performance, and ease of update and maintenance of the operating system.

Figure 1:
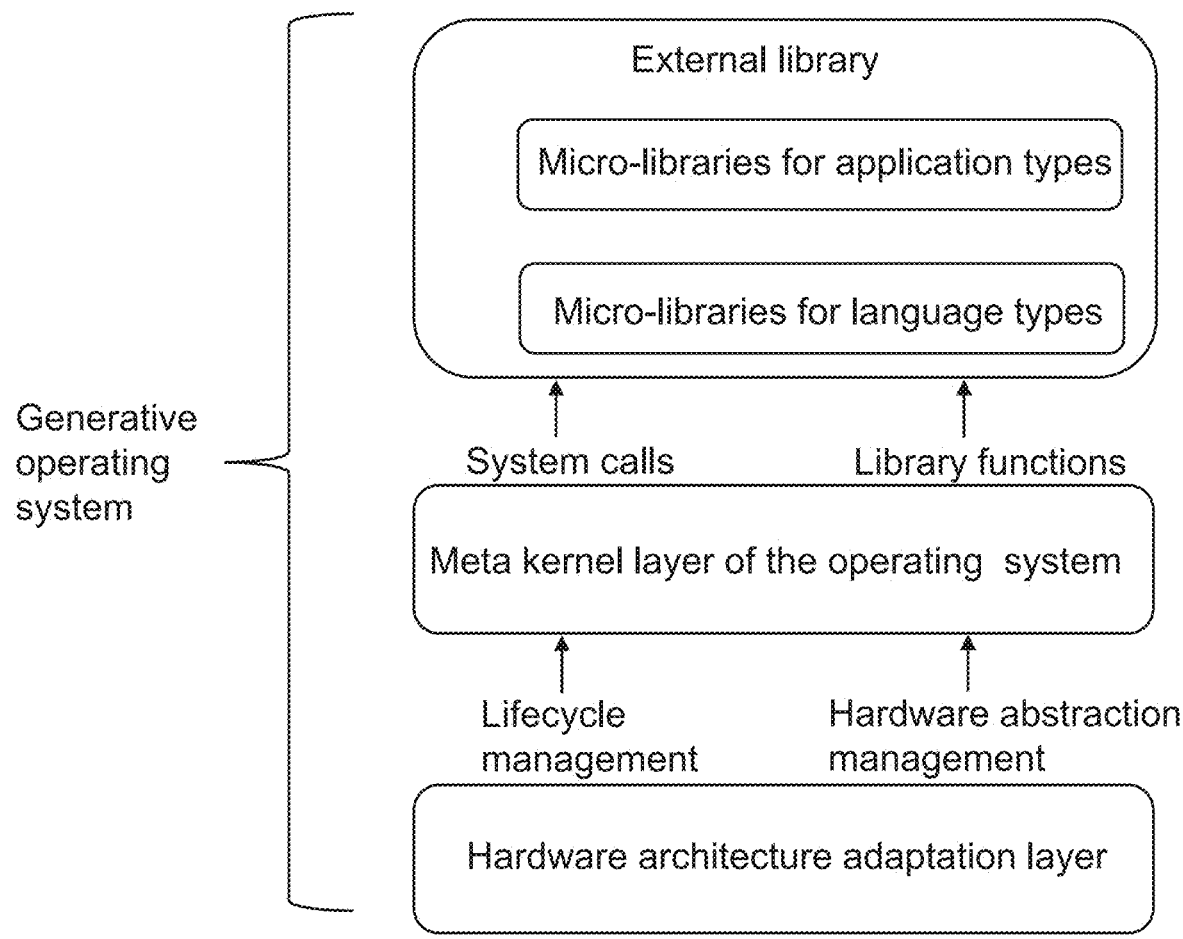
FIG. 1 is a schematic diagram illustrating an architecture of a generative operating system according to an embodiment of the present disclosure.

FIG. 1 is a schematic diagram illustrating an architecture of a generative operating system according to an embodiment of the present disclosure.

In some embodiments, as shown in FIG. 1, the generative operating system divides functions of the system into hierarchical micro-libraries, and the generative operating system may be dynamically assembled under the present architecture to adapt to needs of different applications. The micro-libraries are micro-platforms that realize the functions required by the generative operating system.

In some embodiments, the generative operating system is divided into three layers: a hardware architecture adaptation layer and a meta kernel layer and external libraries of the operating system.

In some embodiments, the hardware architecture adaptation layer is configured to access a hardware and sense a feature of the hardware; and provide lifecycle management (i.e., resource management) and hardware abstraction management (i.e., hardware abstraction) to the meta kernel layer of the operating system.

The lifecycle management refers to management of the meta kernel layer of the operating system from a time it is put into use to a time it is taken out of use, such as maintenance, optimization, evaluation, or the like.

The hardware abstraction management refers to unified management of hardware resources (also referred to as hardware environment), such as the provision of standardized interfaces and functions, modular design, or the like.

In some embodiments, the meta kernel layer of the operating system is configured to realize a basic operating framework of the operating system, and in some embodiments, the basic operating framework includes a dynamic combination framework of micro-libraries, a dynamic updating architecture of the micro-libraries, or the like. The dynamic combination and the dynamic updating refer to the operating system performing the combination and update without being in a shutdown state.

The external libraries refer to micro-libraries that are independent of the generative operating system. In some embodiments, the external libraries are micro-libraries implementations of functions required by the operating system other than the meta kernel layer, wherein the external libraries include programming language micro-libraries for supporting multiple languages and system management libraries for implementing various types of management strategies, or the like.

In some embodiments, the meta kernel layer of the operating system may make system calls to the external libraries and set up a plurality of library functions to call a plurality of micro-libraries in the external libraries.

Through a software-defined technology, the user is enabled to flexibly customize the configuration and functionality of the operating system according to specific proposals, thus providing more personalized services.

Figure 2:
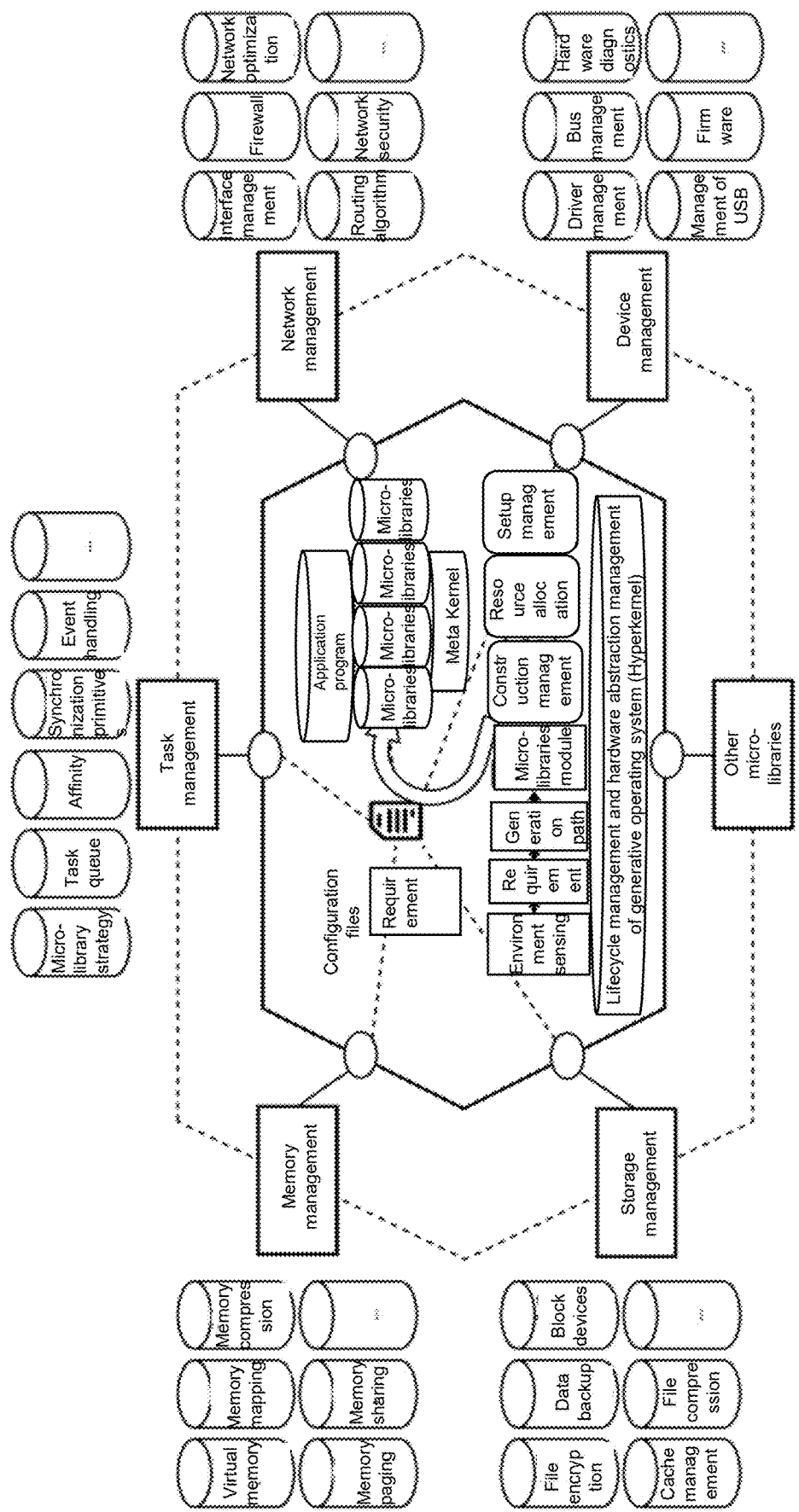
FIG. 2 is a schematic diagram illustrating a generative path for a generative operating system according to some embodiments of the present disclosure.

FIG. 2 is a schematic diagram illustrating a generative path for a generative operating system according to some embodiments of the present disclosure.

In some embodiments, as shown in FIG. 2, the generation path of the generative operating system includes following operations.

S1, decoupling and splitting functional modules of an imperfect generative operating system that do not satisfy the granularity condition (e.g., task management, network management, memory management, device management, storage management in FIG. 2) into micro-libraries of the operating system that satisfy the granularity condition and are independently evolved and updated.

The granularity refers to data used to characterize a size and complexity of a functional module or a micro-library. In some embodiments, the granularity is represented by bytes, and the granularity condition includes the granularity being less than a granularity threshold.

S2, constructing a meta kernel layer of the operating system, selecting required micro-libraries from a plurality of sets of micro-libraries of the operating system through hardware and software environment feature analysis, and then organizing into a plurality of generative operating systems. The process of selecting the required micro-libraries includes generating micro-library configuration files. More descriptions regarding the micro-library configuration files may be found in below and relevant descriptions thereof S3, building a complete generative operating system.

In some embodiments, the hyperkernel is configured to perform startup management, operation management, build management, and resource allocation of the generative operating system on the physical device (i.e., hardware resources), the hyperkernel is further configured to lifecycle management of the generative operating system running on the physical device, and a management of communication interactions among the plurality of generative operating systems.

The hyperkernel and the meta kernel work together in the generative operating system architecture to ensure system flexibility and stability. In some embodiments, the hyperkernel is a senior management layer that is primarily responsible for the generative operating system startup, runtime management, build management, resource allocation, and lifecycle control (also referred to as the lifecycle management). The meta kernel is a core of the generative operating system and is configured to a dynamic combination of the micro-libraries and an implementation of base functionality to meet the needs of applications.

In some embodiments, the hyperkernel relies on a basic operating framework provided by the meta kernel for optimization and tuning of the overall generative operating system by monitoring and managing micro-libraries dynamically assembled by the meta kernel.

Figure 3:
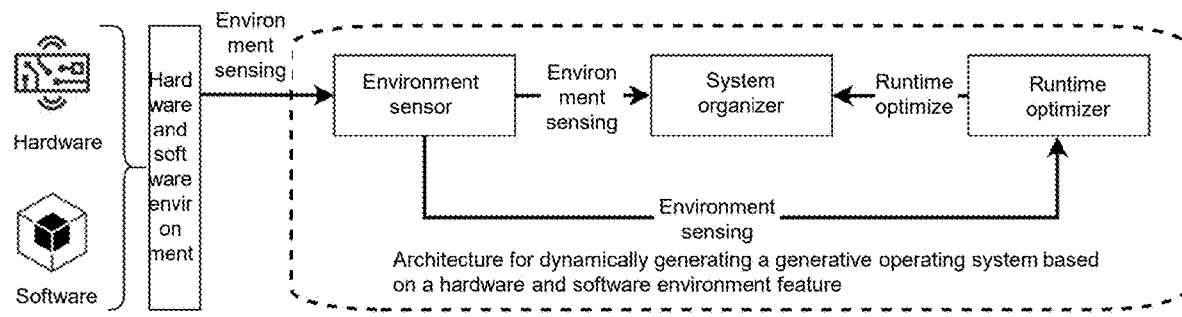
FIG. 3 is a schematic diagram illustrating a method of generating a generative operating system according to some embodiments of the present disclosure.

FIG. 3 is a schematic diagram illustrating a method of generating the generative operating system according to some embodiments of the present disclosure.

In some embodiments, as shown in FIG. 3, a method for dynamically generating a generative operating system based on a hardware and software environment feature may generate a generative operating system, which is implemented by an environment sensor, a system organizer, and a run optimizer, the method includes the following operations:

First, an environment state and application requirement are systematically and comprehensively perceiving by an environment sensor and a configuration file is generated.

The operating system is an imperfect generative operating system. The environment state includes hardware environment features, or the like.

In some embodiments, the environment sensor includes a software sensor and a hardware sensor. The software sensor is configured to capture support requirements (i.e., the application requirements) placed on the operating system from the applications running on the operating system. The hardware sensor is configured to capture hardware environment features in which the operating system runs. The hardware environment features include hardware models, hardware specifications, or the like. The application requirements include storage space, driver model, or the like.

In some embodiments, applications run by the operating system are preset or added by the user based on usage requirements. The support requirements placed on the operating system by the application include computing resources, storage space, or the like to support the operation of the applications. The computing resources include process priority, CPU, a count of CPU cores, or the like.

In some embodiments, the environment sensor generates exhaustive configuration files (e.g., the micro-library configuration files in FIG. 2) after collecting information from the software sensor and the hardware sensor. The configuration files include required micro-libraries and data related to the micro-libraries (storage address of the micro-libraries, interfaces, etc.), or the like.

The generative operating system can meet requirements of specific hardware devices and software more accurately, which can effectively avoid over-functionality or under-functionality, thus improving the overall effectiveness of the system.

Secondly, the corresponding micro-libraries are parsed through the configuration files and a corresponding micro-libraries collection is obtained through a micro-library marketplace.

The process is implemented through the system organizer. The micro-libraries collection includes a plurality of micro-libraries required for the generative operating system.

In some embodiments, the micro-library marketplace includes a plurality of micro-libraries set up locally, a plurality of micro-libraries from third-party platforms or networks, or the like.

In some embodiments, the plurality of micro-libraries include modular implementations of various functions of the operating system. The plurality of micro-libraries may be flexibly combined based on usage requirements. The various functions include specific function points in various system modules such as task management, network management, memory management, device management, storage management, or the like.

In some embodiments, as shown in FIG. 2, the task management includes a task scheduling algorithm, an interrupt management mechanism, a micro-library strategy, a task queue, affinity, synchronization primitives, event handling, or the like. The network management includes interface management, firewall, network optimization, a routing algorithm, and network security. The memory management includes virtual memory, memory mapping, memory compression, memory paging, and memory sharing. The device management includes driver management, bus management, hardware diagnostics, and management of USB and firmware. The storage management includes block devices, data backup, file encryption, cache management, and file compression.

Subsequently, configured micro-libraries are assembled into the generative operating system by the system organizer.

The process is achieved through the system organizer. The system organizer is not only configured to assemble the micro-libraries and ensure compatibility and efficient collaboration between the different micro-libraries to dynamically generate a generative operating system that is optimized for a specific application proposal.

Finally, the generative operating system is dynamically adjusted and optimized in real time by the run optimizer based on changes in a runtime environment and operational requirements. The operational requirements refer to usage requirements of a user.

In some embodiments, the runtime environment includes a hardware runtime environment and a software runtime environment. The hardware runtime environment refers to resources provided by hardware resources for operation of the generative operating system, e.g., storage space, CPU arithmetic, a count of CPU cores, or the like. The software runtime environment refers to resources provided by software resources (also referred to as software environment) for the operation of the generative operating system, e.g., compiled programs, databases, or the like.

In some embodiments, changes in operational requirements include increasing or decreasing a count of applications needed.

In some embodiments, the environment sensor is configured to sense an external hardware and software environment and provide recommendations for the organizational configuration of the micro-libraries to the system organizer. The software sensor automatically matches the micro-libraries collection required for the application runs by sensing the application and the usage requirements of the user. The hardware sensor is configured to sense the hardware environment feature of the operating system, sense and model the hardware resources, and perform driver matching according to a user-configured performance strategy to automatically match the micro-libraries collection required by the hardware environment feature. The user-configured performance strategy is preset by the user based on the need for performance of the generative operating system. The driver matching refers to configuring a corresponding driver tool for the hardware resources.

In some embodiments, the system organizer is configured to parse on-requirement in different application proposals and obtain required figurative micro-libraries through a micro-library center, and dynamically assemble a meta kernel layer of the operating system with the different types of the micro-libraries to generate a flexible and multimodal generative operating system that may effectively meet the challenges of diverse application proposals.

The micro-library center is also referred to as a micro-library market. The figurative micro-libraries refer to micro-library data packages including data such as program codes. The flexibility refers to an ability of the operating system to adapt to multiple application proposal changes.

In some embodiments, the system organizer includes a parser and an assembler. The parser is configured to retrieve and obtain the desired micro-libraries for the micro-library center based on the configuration files provided by the hardware sensor and the software sensor. The assembler assembles, compiles, and links different types of micro-libraries obtained on requirement with the meta kernel layer of the operating system to generate a flexible and multi-modal generative operating system.

The compiling refers to executing a compilation program read from a memory, reading the source code corresponding to the micro-libraries from the storage space to the memory, and processing the source code corresponding to the micro-libraries in the memory to generate a binary program corresponding to the micro-libraries.

In some embodiments, the run optimizer focuses on performance optimization of runtime adaptation of the generative operating system. The runtime dynamic optimization of the generative operating system is achieved by sensing an upper layer application (i.e., an application program) and a system self-update instruction through the environment sensor to realize a system configuration and dynamic update of a micro-libraries version of the generative operating system.

The system self-update instruction refers to an instruction issued by the generative operating system that updates the system itself.

The dynamic updating of the micro-libraries or the micro-libraries version refers to a process of executing a replacement of the micro-libraries in the memory, i.e., replacing an old version of the micro-libraries in the memory with a new version of the micro-libraries or replacing a micro-libraries file in the memory with different types of micro-libraries. The replacement process includes loading the new micro-libraries and unloading the old micro-libraries.

Loading the new micro-libraries refers to executing a process of reading the micro-libraries from the storage into the memory for execution, and compiling and processing the source code corresponding to the micro-libraries in the memory to generate a binary program corresponding to the new micro-libraries, so as to enable the generative operating system and the hardware to run the program of the new micro-libraries in the memory.

Unloading the old micro-libraries refers to executing a process of removing the program corresponding to the old micro-libraries from the memory, so that the generative operating system and the hardware do not run the program corresponding to the old micro-libraries in the memory.

In some embodiments, the run optimizer includes an intelligent runtime sensor and a dynamic updater. The intelligent runtime sensor monitors the micro-libraries through the generative operating system, captures a runtime state of the generative operating system in real time, and automatically performs system configuration tuning and micro-libraries updates in response to a change of the system configuration and requirements for the performance optimization. The dynamic updater is configured for adaptive real-time compilation and dynamic updating of the micro-libraries within the generative operating system. The dynamic update mechanism allows the intelligent runtime sensor to dynamically load or unload the micro-libraries according to changing requirements.

The runtime state includes normal operation or abnormal operation. The abnormal operation includes higher CPU load, longer response time, or the like.

According to the embodiments of the present disclosure, new hardware and software developments can be adapted more quickly, which can enable an instant updating and optimization of the generative operating system, thereby ensuring the most up-to-date and optimal performance of the system.

Figure 4:
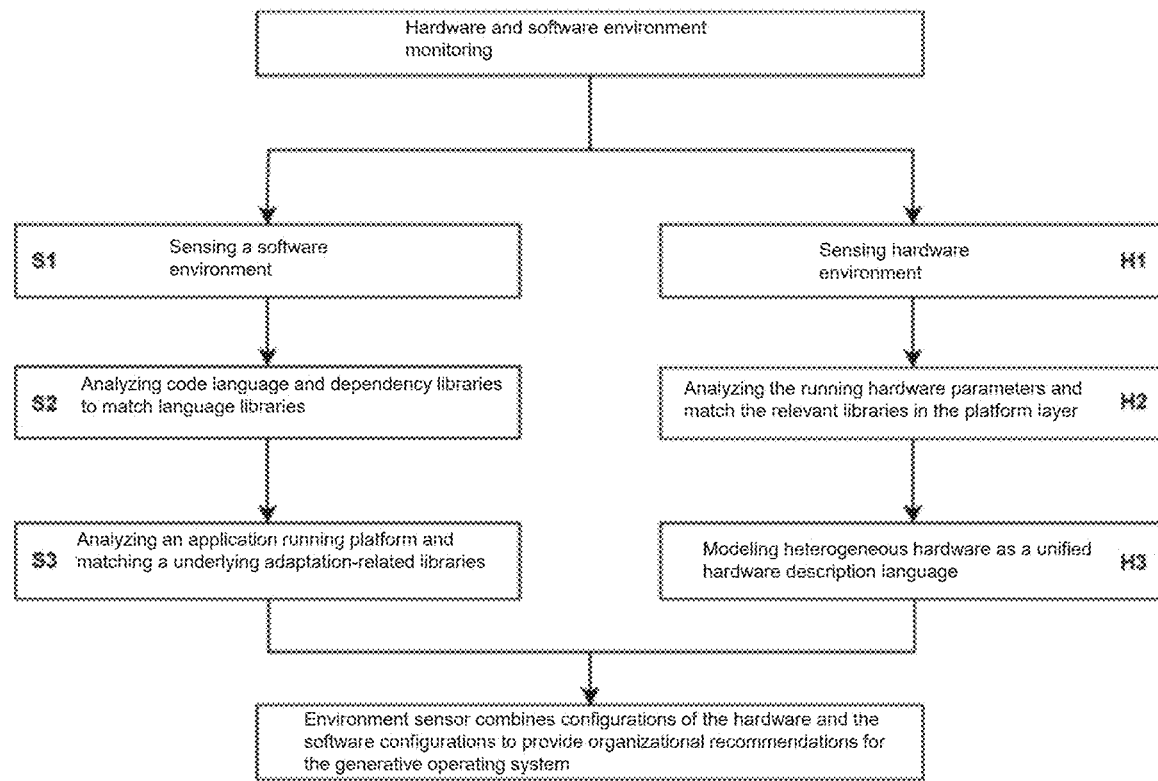
FIG. 4 is a schematic diagram illustrating a collaborative perception of a hardware sensor and a software sensor according to some embodiments of the present disclosure.

FIG. 4 is a schematic diagram illustrating a collaborative perception of a hardware sensor and a software sensor according to some embodiments of the present disclosure. More descriptions regarding the hardware sensor and the software sensor may be found in FIG. 3 and relevant descriptions thereof.

In some embodiments, as shown in FIG. 4, the environment sensor is divided into a hardware sensor (H) and a software sensor (S), both of which collaborate to sense hardware and software environment conditions, monitor hardware and software environment changes, and provide strong support for the configuration of the generative operating system and for the optimization of the generative operating system at runtime.

In some embodiments, as shown in FIG. 4, the workflow of the software sensor includes:

S1, sensing a software environment.

S2, analyzing code language and dependency libraries to match language libraries.

S3, analyzing an application running platform and matching aN underlying adaptation-related libraries.

As shown in FIG. 4, a workflow of the hardware sensor includes:

H1, sensing hardware environment.

H2, analyzing the running hardware parameters and match the relevant libraries in the platform layer.

H3, modeling heterogeneous hardware as a unified hardware description language.

The heterogeneous hardware refers to a differently structured hardware corresponding to the configuration of the generative operating system.

The environment sensor combines configurations of the hardware and the software configurations to provide organizational recommendations for the generative operating system.

In some embodiments, $E_{hw}$ and $E_{sw}$ are denoted as the hardware environment state and the software environment state, a work of the environment sensor is represented as a function $F_{opt}(E_{hw}, E_{sw}) \rightarrow (C_{hw}, C_{sw})$, wherein $C_{hw}$ and $C_{sw}$ respectively represent configuration decisions of the hardware and the software. The hardware environment state refers to data that features the current hardware environment. The software environment state refers to data that features the current software environment.

Through unified identification and abstraction of heterogeneous hardware resources, the hardware sensor (H) may sense and adapt to the variable hardware environments accurately in which the generative operating system resides.

Aiming at the emerging diverse hardware chips, the hardware sensor deploys a flexible system adaptation architecture to realize seamless adaptation to various hardware systems.

In some embodiments, the hardware sensor adopts a dual-attribute feature manner $M_{attr}$ that combines the resource $R_{res}$ and capability attributes $C_{cap}$ to provide a more comprehensive description of the hardware device (i.e., the hardware description language), a specific feature equation for the hardware environment state $E_{hw}$ is shown below:

$$E_{hw} = M_{attr}(R_{res}, C_{cap}(D_{hw}, R_{hw}, L_{hw}))$$

Wherein $D_{hw}$ denotes a dynamic nature of the hardware device, $R_{hw}$ denotes a reconfigurable nature of the hardware device, and $L_{hw}$ denotes an autonomous learning nature of the hardware device.

The dual-attribute feature manner is a process of describing a single piece of data or a feature by two types of data. The resources refer to data that feature a plurality of hardware resources (i.e., the hardware device). The capability attributes refer to data that feature the performance of the hardware resources. The dynamic nature refers to data that feature a likelihood of replacement or reconfiguration of the hardware device. The reconfigurable nature refers to data that features the ability of the hardware device to adjust parameters based on requirements. The autonomous learning nature refers to data that feature the ability of the hardware device to perform autonomous learning.

In order to accurately simulate complex hardware environments, the hardware sensor describes the hardware environment through a specialized hardware description language. In the application of virtualization technology, the hardware sensor introduces a dynamic lightweight virtualization framework to accommodate the wide diversity of the heterogeneous hardware.

The software sensor (S) performs modeling $E_{sw}$ based on complex software environment perception and software environment state of human-computer-object fusion to adapt to the diversity and complexity of modern software environments.

In some embodiments, the software sensor continuously monitors and dynamically adapts to changes in the state of the software environment in different application proposals $\Delta E_{sw}$. The changes in the state of the software environment include an evolution of user requirements $\Delta U_{req}$, a flow of sensor data, and a fluctuation $\Delta E_{cond}$ of the environmental condition. The evolution of user requirements refers to data that features changes in user needs. The flow of sensor data refers to data that features fluctuations in sensor data. The fluctuations of the environmental condition refer to data that feature fluctuation in the operating system that supports the operation of the software.

In some embodiments, prior to the generation phase of the generative operating system, the software sensor performs highly accurate system functional modeling ($M_{func}$) for the application (including but not limited to resource requirement detection and identification of specific functional dependencies, etc.) through an in-depth analysis of the application environment $E_{cond}$ and the program code $U_{req}$, as featured by the equation:

$$\Delta E_{sw} = \Delta U_{req} + \Delta S_{data} + \Delta E_{cond}$$

$$E_{sw} = M_{func}(\Delta E_{sw}, E_{cond}, U_{req})$$

The combination of the hardware sensor and the software sensor enables that the adaptive generative operating system can comprehensively adapt to and optimize the hardware and software environment($F_{opt}(E_{hw}, E_{sw})$) in which it runs.

The application environment refers to data that features the data associated with the operating system that supports operation of an upper layer application. The program code refers to a program code required for running the upper layer application. The system function modeling refers to a simulation of the functionality that is achieved by running the upper layer application.

Relying on both the software sensor and the hardware sensor, the generative operating system can be optimized specifically for a certain application to automate generate a customized operating system that is optimally configured for performance, security, and efficiency. The innovative design allows the operating system to not only precisely meet the unique requirements of the application but also achieve the best standards of performance and security in overall operation.

Figure 5:
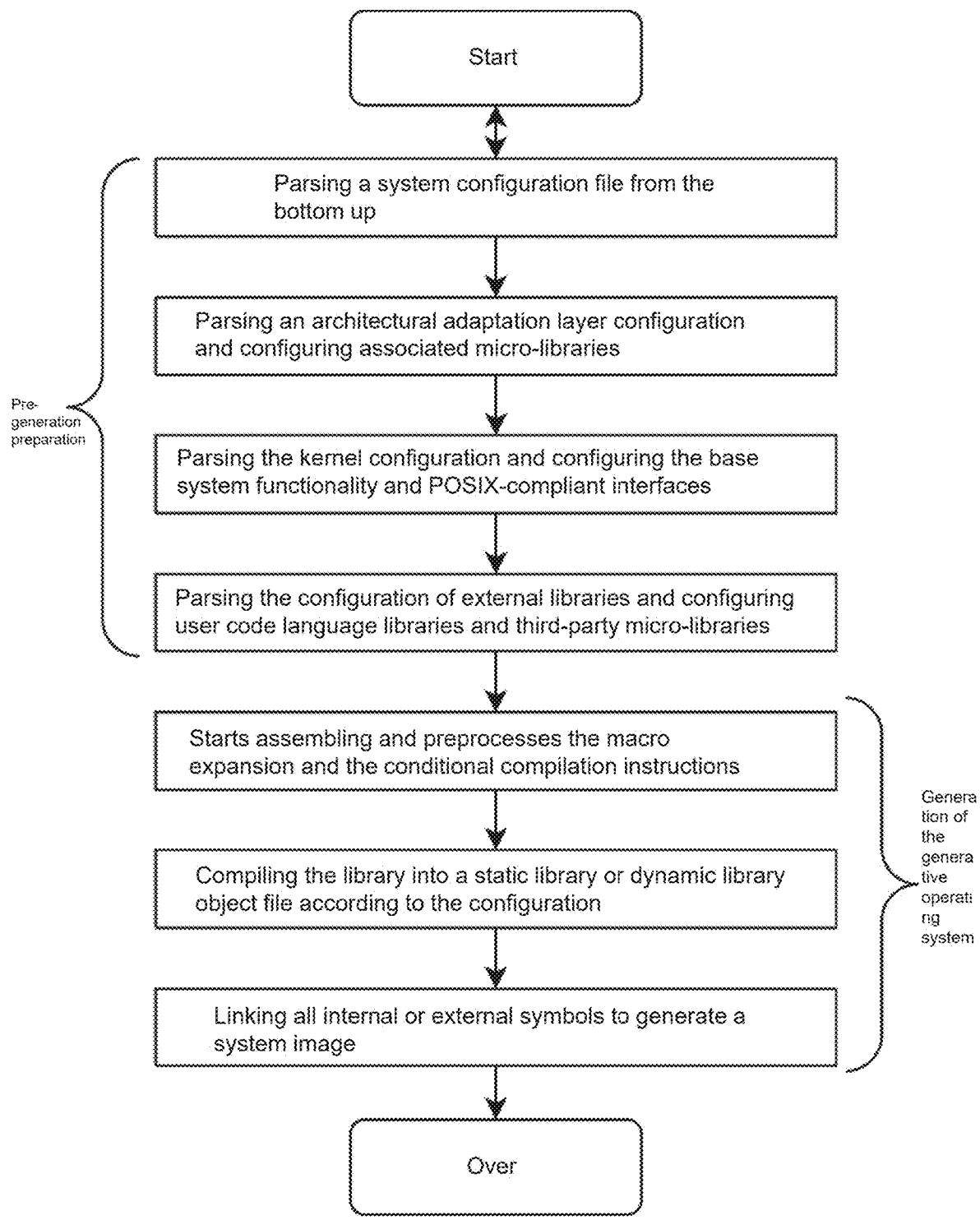
FIG. 5 is a flowchart illustrating a system organizer according to some embodiments of the present disclosure.

FIG. 5 is a flowchart illustrating a system organizer according to some embodiments of the present disclosure. More descriptions of the system organizer may be found in FIG. 3 and relevant descriptions thereof.

In some embodiments, the system organizer plays a critical role in the process of operating system generation. The system organizer is configured for the dynamic assembly of the micro-libraries, which is a core of construction of the operating system. The system organizer consists of two key subsystems: the parser and the assembler. The two subsystems work together in close collaboration to form a final image of the generative operating system. The parser is configured to parse the various configurations of the generative operating system. The assembler is not only configured to realize the dynamic construction of the micro-libraries in the generative operating system, but also effectively promote the synergy between the hardware and the software to optimize the performance and enhance the security of the generative operating system. The assembly process of the system organizer is shown in FIG. 5.

In some embodiments, the system organizer, when performing the generation of the generative operating system, a pre-generation preparation is performed via the parser and the generation of the generative operating system is completed via the assembler.

In some embodiments, the system organizer completes the assembly of the generative operating system image with the parser and assembler together, including a configuration phase and an assembly phase. The configuration phase is also referred to as the pre-generation preparation.

The configuration phase specifically includes following operations.

First, the parser parses a configuration file of the system layer by layer from the bottom up. This operation allows the parser to scrutinize and configure the underlying platform layer micro-libraries that are compatible with the hardware architecture.

Next, the parser parses the configuration file and obtains the base micro-libraries at the core of the system and configures the base system functions. This operation is a critical part of building a stable and efficient generative operating system.

Then, the parser turns to a configuration of external libraries and carefully configures third-party micro-libraries on the periphery of the user-code language library to ensure system versatility and extensibility.

In some embodiments, the workflow of the parser is as shown in FIG. 5: the parser parses the system configuration file from the bottom up. The parser parses the configuration of the architectural adaptation layer and configures the associated micro-libraries. The parser parses the kernel configuration and configures the base system functionality and POSIX-compliant interfaces. The parser parses the configuration of external libraries and configures user code language libraries and the third-party micro-libraries.

After the configuration is complete, the parser may also make a request to a micro-library marketplace for the required micro-libraries. If the required micro-libraries are missing locally, the imperfect operating system may automatically download the required micro-libraries and store the required micro-libraries locally using a preset storage manner. The preset storage manner includes hash technology, or the like.

In some embodiments, in response to the completion of the pre-generation preparation, the assembler assembles the micro-libraries and forms a final generative operating system image.

The assembly phase specifically includes following operations.

First, the assembler preprocesses all of the code for macro expansion and handling conditional compilation instructions.

Then, the assembler starts to compile the libraries one by one, the order of compilation is based on an order of dependencies between the libraries, and this operation also checks whether the dependencies of each library are correct. The libraries may be compiled as static or dynamic object files based on the configuration item.

At the end of compilation, the assembler links the object files described above. The assembler links the symbols together either statically or dynamically, and ultimately assembles them into the generative operating system image. The symbols refer to identifiers used to indicate the storage address of an object file.

In some embodiments, the workflow of the assembler is as shown in FIG. 5: the assembler starts assembling, and preprocesses the macro expansion and the conditional compilation instructions. The assembler compiles the library into a static library or dynamic library object file according to the configuration. The assembler links all internal or external symbols to generate a system image.

After obtaining the generative operating system image, the system organizer physically assembles the architecture, micro-libraries, etc., contained in the generative operating system image, and obtains a generative operating system identical to the generative operating system image.

The entire assembly process not only demonstrates a high degree of automation and intelligence in the design of the system but also ensures that the generated operating system image can maintain optimal performance in diverse hardware and software environments. With a highly flexible and customizable assembly process, it is possible to quickly respond to changes in application requirements, while also conforming to the future trend of intelligent computing environments.

Figure 6:
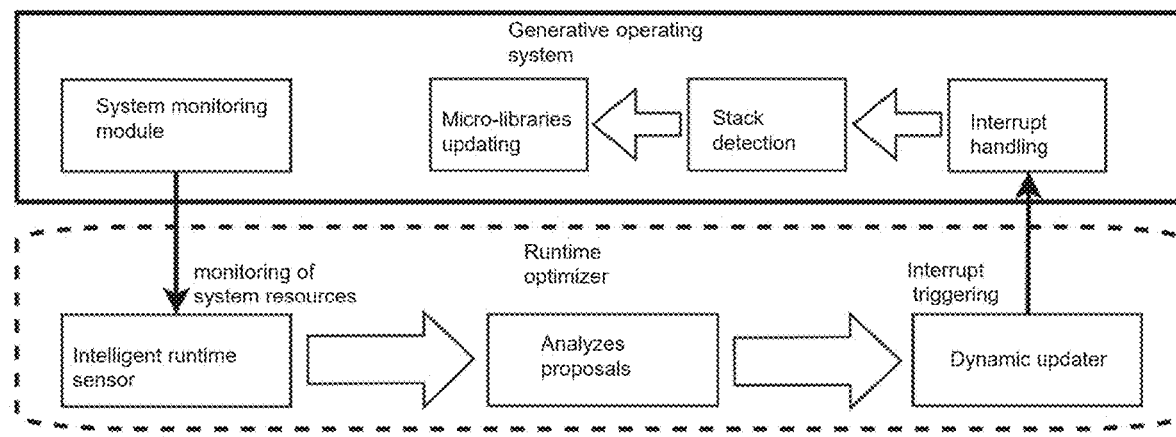
FIG. 6 is a flowchart illustrating a run optimizer according to some embodiments of the present disclosure.

FIG. 6 is a flowchart illustrating a run optimizer according to some embodiments of the present disclosure. More descriptions regarding the run optimizer may be found in FIG. 3 and relevant descriptions thereof.

In some embodiments, the run optimizer is divided into an intelligent runtime sensor and a dynamic updater, which is configured to the management of the operation of the generative operating system, and through dynamic monitoring of the resources and techniques of dynamic updating of the micro-libraries, the run optimizer may ensure the optimal runtime state of the generative operating system and the latest micro-libraries version, so as to realize the flexible and intelligent feature of the generative operating system.

In some embodiments, the intelligent runtime sensor includes a system operation monitoring module ($M_{res}$) configured to receive and process an operation condition sent by a built-in monitoring module of the generative operating system in operation and monitor an external hardware and software environment condition (also referred to as external hardware and software environment).

The built-in monitoring module is configured to monitor the operation condition of the operating system. The operation condition refers to data related to the operation of the operating system, such as response time, CPU utilization, or the like.

In some embodiments, as shown in FIG. 6, the intelligent runtime sensor is configured to receive and process monitoring of system resources sent by the system monitoring module (i.e., the built-in monitoring module) of the running generative operating system. The intelligent runtime sensor analyzes a proposal based on the monitoring of system resources and sends the dynamic updated proposal to the dynamic updater. The dynamic updated proposal refers to a proposal that instructs the dynamic updater to perform dynamic updates to the micro-libraries.

After receiving the dynamic updated proposal, the dynamic updater controls the generative operating system to perform operations of interrupt triggering and interrupt handling, stack detection, and micro-libraries updating to complete the micro-libraries updating in the generative operating system.

In some embodiments, the run optimizer may also sense an upper layer application and a system self-update instruction based on a system scan period via an environment sensor, and capture a runtime state of the generative operating system via the intelligent runtime sensor. The run optimizer determines micro-libraries update parameters based on the upper layer application, the system self-update instruction, and the system runtime state, and based on the micro-libraries update parameters, generates the micro-libraries update instruction to perform dynamic loading and unloading of the micro-libraries of the generative operating system. More descriptions regarding the run optimizer may be found in FIG. 8 and relevant descriptions thereof.

More descriptions regarding the environment sensor and the system self-update instruction may be found in FIG. 3 and relevant descriptions thereof.

The system scan period is a time interval at which the generative operating system periodically scans itself.

In some embodiments, the system scan period is determined in a plurality of ways. For example, the system scan period is predetermined by the technician based on experience.

In some embodiments, the run optimizer determines the system scan period based on a frequency of error reporting and an application runtime feature of the generative operating system when it runs the upper layer application.

The frequency of error reporting is configured to feature a frequency with which the generative operating system runs into errors. In some embodiments, the frequency of error reporting is featured by a count of errors reported per unit of time. The operational errors include long response times, or the like. The generative operating system automatically reports an error to the run optimizer when the generative operating system encounters an operational error. The run optimizer counts a count of times the generative operating system reports errors per unit of time as the frequency of error reporting.

The application runtime feature refers to data related to the operation of the upper layer application. In some embodiments, the application runtime feature includes an average runtime of a plurality of upper layer applications. The average runtime is an average of runtime lengths of multiple runs of the upper layer application.

In some embodiments, the run optimizer counts the runtime lengths of multiple runs of the upper layer application in the historical runtime record, and obtains an average of the runtime lengths as the average runtime length of the upper layer application.

In some embodiments, the system scan period correlates to the frequency of error reporting and the application operational feature. For example, the system scan period negatively correlates to the frequency of error reporting and positively correlates to the application runtime feature, and the generative operating system may adjust the system scan period based on the frequency of error reporting and the application runtime feature. Understandably, the higher the frequency of error reporting indicates that the current micro-libraries are difficult to satisfy the operation of the upper layer application, and thus the system scan period needs to be shortened to update the micro-libraries promptly. The longer the application runtime feature, the more stable the running of the upper layer application, and there is no need to update the micro-libraries, so the system scan period may be extended.

By monitoring the frequency of error reporting and the application running feature when the upper layer application is running, the run optimizer can capture the error information in the first time and dynamically adjust the system scan period, and then update the micro-libraries in time.

The upper layer application refers to an application that is running in the upper layer of the generative operating system.

The system runtime state refers to data that feature the operational processes of the generative operating system. In some embodiments, the system runtime state includes system error reporting data, operational speed, responsiveness, or the like. The system error reporting data includes the time of error reporting, the type of error reporting, or the like.

The micro-libraries update parameters refer to parameters associated with dynamic updates of the micro-libraries. In some embodiments, the micro-libraries update parameters includes a new micro-library that needs to be loaded and an old micro-library that needs to be unloaded.

In some embodiments, the run optimizer may determine the micro-libraries update parameters in a plurality of ways. For example, in response to a change of at least one of the upper layer application, the system self-update instruction, and the system runtime state, the run optimizer constructs a first matching vector based on at least one of the changed upper layer application, the system self-update instruction, and the system runtime state, and retrieves, based on the first matching vector, a first target vector in the first vector database that satisfies a first matching condition. The run optimizer determines the micro-libraries update parameters based on micro-libraries parameters corresponding to the retrieved first target vector. The first matching condition includes having a highest vector similarity to the first matching vector. The vector similarity is negatively correlated to a vector distance. The vector distance includes a Euclidean distance, or the like.

The first vector database is preset based on historical running record and includes a plurality of first target vectors and micro-libraries parameters corresponding to different first target vectors. The first target vectors refer to feature vectors constructed based on at least one of the historical upper layer application, the historical update instruction, and the historical system runtime state. The historical update instruction is a system self-update instruction in historical data.

The micro-libraries parameters refer to a historical micro-libraries collection with best running effects corresponding to the first target vectors in the historical run record. More descriptions regarding the micro-libraries collection may be found in FIG. 3 and relevant descriptions thereof.

In some embodiments, the running effect is indicated by data such as resource consumption, the number of occurred errors, and the number of times a lag occurs. The best running effects include the least amount of resource consumption, the least number of errors occurring, the least number of lags occurring, or the like.

In some embodiments, the micro-libraries update parameters further include micro-libraries update time. The run optimizer determines a future usage feature based on the system usage feature, determines the future usage feature through a predictive model, and determines the micro-libraries update time based on the future usage feature and the resource occupancy status.

The micro-libraries update time refers to a specific time point for updating the micro-libraries.

In some embodiments, the system usage feature includes periods during which the user is using different features or the upper layer application in the generative operating system.

The future usage feature refers to a system use feature in a future period. In some embodiments, the future period is preset based on experience.

The predictive model refers to a model used to predict the future usage feature. In some embodiments, the predictive model is one or a combination of machine learning models such as a Long Short-Term Memory (LSTM) networks or other customized model structures.

In some embodiments, inputs to the predictive model include a system usage feature sequence and outputs of the predictive model include the future usage feature. The system usage feature sequence is a system usage feature sequence for a plurality of consecutive historical periods. The plurality of historical periods are divided based on changes in the historical application runtime state, for example, the generative operating system uses a point in time when a single application begins running or ends running as a point of division between historical periods.

In some embodiments, the run optimizer may train the predictive model based on a large number of first training samples with a first label by gradient descent. In some embodiments, the training samples include a sample system usage feature sequence over a first historical period. The first label includes a system usage feature within a second historical period. The first historical period precedes the second historical period. The first training samples and the first label may be obtained based on the historical run record.

In some embodiments, the predictive model may be obtained by training: inputting a plurality of first training samples with a first label into an initial predictive model, constructing a loss function by a result of the first label and the initial predictive model, iteratively updating parameters of the initial predictive model based on a value of the loss function. The model training is completed when the loss function of the initial predictive model satisfies a predetermined condition, and the trained predictive model is obtained. The preset condition includes the loss function converging, a count of iterations reaching a threshold, or the like.

The resource occupancy status refers to data that features how the upper layer application or functions are occupying computing resources. In some embodiments, the resource occupancy status includes the amount of computing resources for different upper layer applications or functions. The amount of compute resources is expressed as a ratio of compute resources used to total compute resources. The run optimizer obtains the resource occupancy status by obtaining the amount of compute resources for the different upper layer applications or functions through the process runtime table of the generative operating system.

The process runtime table is a table of data that is automatically generated when the generative operating system is running indicating the amount of computing resources used by each upper layer application or function.

In some embodiments, the run optimizer divides the future period into a plurality of sub-periods based on updating period requirements, and obtains, based on the upper layer applications used within each sub-period in the future usage profile and the corresponding resource occupancy status of the upper layer applications, a total running load within each sub-period.

The updating period requirements refer to a time period required to complete the updating of the micro-libraries. The total running load refers to a total amount of compute resources used by a plurality of upper layer applications in the future period. In some embodiments, the updating period requirements are obtained statistically by a historical runtime record.

In some embodiments, the run optimizer determines the micro-libraries update time in a plurality of manners. For example, the generative operating system uses a sub-period of time where the total running load is less than a load threshold as the micro-libraries update time. The load threshold is preset by a technician based on experience.

In some embodiments, different function modules correspond to the micro-libraries with different micro-libraries update times. The run optimizer may determine the micro-libraries update times for different micro-libraries.

In some embodiments, for the micro-libraries corresponding to different functional modules, the run optimizer determines, based on a plurality of sub-periods of time, a sub-period of time that satisfies an update condition as micro-libraries update time for the micro-library corresponding to the functional module. More descriptions regarding the functional module may be found in FIG. 2 and relevant descriptions thereof.

In some embodiments, the update condition is preset based on historical experience, which includes that no associated applications are running and the total running load is less than the load threshold. If an upper layer application requires one or more micro-libraries to run and be used, the run optimizer may treat the upper layer application as the associated application of one or more micro-libraries.

By selecting among multiple sub-periods of time that do not have associated application running for the micro-libraries updates, the micro-libraries updates can avoid impacting running applications.

Predicting the future usage feature through the predictive model can predict the resource requirements of the upper layer application in the future period more accurately, thus enabling the selection of the optimal time for micro-libraries updating to ensure that the updating process does not interfere with the operation of critical applications and improves overall resource utilization.

In some embodiments, in response to the generative operating system receiving the new application data, the run optimizer may also parse the new application data to determine the associated software data and associated hardware data corresponding to the new application. The run optimizer determines the micro-libraries update parameters based on the new application data, the associated software data, and the associated hardware data, and generates a micro-libraries update instruction based on the micro-libraries update parameters.

The new application data refers to data associated with a new application. The new application refers to an application newly configured on the generative operating system. In some embodiments, the new application data includes an installation package, a name, a type, a developer, and use of the new application.

The associated software data refers to one or more functional modules that correspond to the new application, such as task management, network management, or the like.

The associated hardware data refers to data related to hardware resources required for new applications, such as code to enable the microphone and camera.

In some embodiments, the run optimizer parses the new application data, retrieves codes related to functional modules corresponding to the new application and the hardware resources required for the new application through manners such as key character retrieval, and obtains the associated software data and the associated hardware data corresponding to the new application.

In some embodiments, the run optimizer constructs a second matching vector through the new application data (excluding the installation package), the associated software data, and the associated hardware data, searches in a second vector database using the second matching vector, obtains a second target vector that satisfies a second matching condition, and uses historical micro-libraries update parameters corresponding to the second target vector as the micro-libraries update parameters. The second matching condition includes having the highest vector similarity to the second matching vector. The manner of constructing the second vector database is similar to the manner of constructing the first vector database, which can be found in previous descriptions related to the first vector database. The second target vector refers to a feature vector constructed based on historical application data, historical associated software data, and historical associated hardware data.

By parsing the new application data, the associated software data, and the associated hardware data, the run optimizer can understand the requirement of the new application for resources more accurately, and thus reasonably allocating the system resources. Meanwhile, based on the parsing result, the generative operating system can dynamically adjust the micro-libraries update parameters to meet the needs of the new application, which enhances the adaptability and flexibility of the system.

In some embodiments, in response to the run optimizer recognizing the change of the hardware environment via the hardware sensor in the environment sensor, the run optimizer may also generate the micro-libraries update parameters based on the changed hardware environment. The run optimizer generates the micro-libraries update instruction based on the micro-libraries update parameters.

In some embodiments, the run optimizer looks up a set of adapted micro-libraries corresponding to the changed hardware environment in a matching table based on the changed hardware environment. If a version of the current micro-library is not included in the set of adapted micro-libraries, a latest version of the current micro-library is selected from the set of adapted micro-libraries as a new micro-library that needs to be loaded, and the current micro-library is selected as an old micro-library that needs to be uninstalled, which in turn determines the micro-libraries update parameters. If the version of the current micro-library is included in the set of adapted micro-libraries, there is no need to determine the micro-libraries update parameters. The micro-libraries update time in the micro-libraries update parameters is determined by determining the micro-libraries update time as described above.

In some embodiments, the matching table is constructed through extensive testing and user data, and includes the set of adapted micro-libraries that match different hardware environments. The set of adapted micro-libraries includes a plurality of versions respectively corresponding to a plurality of micro-libraries.

As an example only, when a version of the micro-library runs on the hardware environment, if the hardware in the hardware environment can be used normally and a count of reported errors is less than a predetermined error reporting threshold, that version of the micro-library is counted in the set of adapted micro-libraries that matches the hardware environment. The preset error reporting threshold is preset by a technician based on experience.

When the run optimizer detects a change in the hardware environment, the micro-libraries update parameters may be adjusted accordingly, which enables the generative operating system to quickly adapt to the new hardware environment and ensures the smooth operation of the system.

In some embodiments, the run optimizer compares the determined micro-libraries update parameters with a current micro-libraries collection, and treats micro-libraries that are present in the micro-libraries update parameters and are not present in the current micro-libraries collection as new micro-libraries that need to be loaded, and treats micro-libraries that are not present in the micro-libraries update parameters and are present in the current micro-libraries collection as old micro-libraries to be unloaded, so as to generating the micro-libraries update instruction.

In some embodiments, the run optimizer converts the micro-libraries update parameters into a machine instruction and uses the machine instruction as micro-libraries update instruction to perform dynamic loading and unloading of the micro-libraries in the generative operating system.

In responding to the changes in the upper layer application, the system self-update instruction, and the system runtime state, the micro-libraries update parameters are determined promptly, and the corresponding micro-libraries update instruction is generated to dynamically load and unload the micro-libraries, allowing the generative operating system to respond to changing application proposals and user requirements more flexibly. At the same time, it can also achieve precise configuration of the system resources, which not only improves resource utilization, but also effectively reduces unnecessary resource occupancy, thus optimizing system performance.

In some embodiments, the intelligent runtime sensor not only monitors the system resources but also includes responses to changes in the system configuration and micro-libraries update requirements.

In some embodiments, the intelligent runtime sensor performs the following operations when environment variables such as the system resources ($R_{sys}(R_{guest}, R_{host})$), the micro-libraries version ($V_{lib}$), and the application requirements ($D_{app}$) change.

First, a plurality of dynamic updated proposals is proposed. More descriptions regarding the dynamic updated proposals may be found in FIG. 4 and relevant descriptions thereof.

Subsequently, the intelligent runtime sensor combines a resources condition of the system environment to achieve a quantitative comparison between an existing running proposal and the plurality of dynamic updated proposals by an optimization function, and selects the best dynamic updated proposal to be handed over to the dynamic updater for dynamic updating of the resources. The existing running proposal refers to the existing micro-libraries configuration of the generative operating system.

In some embodiments, the optimization function is preset based on historical experience and includes a plurality of forms. For example, the optimization function ($F_{opt}$) may be represented by the following equation:

$$F_{opt} = \mathrm{argmax}_{U \in U_{proposal}} f(R_{sys}, V_{lib}, D_{app}, U)$$

Wherein $f$ denotes an evaluation function for evaluating the resource condition $R_{sys}$, the micro-libraries version $V_{lib}$, the application requirements $D_{app}$, and a fitness of the updated proposals U (i.e., the dynamic updated proposals ($U_{proposal}$)). The resources $R_{sys}$ is also referred to be as the system resources ($R_{sys}(R_{guest}, R_{host})$).

The system resources ($R_{sys}(R_{guest}, R_{host})$) refer to data that features the current resources of the system based on the operational condition and external software and hardware environment. More descriptions of the operation condition and the external hardware and software environment condition can be found previously.

In some embodiments, the dynamic updater is primarily configured to compile and dynamically update the micro-libraries in the adaptive generative operating system. This functionality is achieved by dynamically loading the micro-libraries, allowing the generative operating system to load and unload the micro-library modules at runtime in response to changing requirements. In some embodiments, the dynamic updater is further configured for managing the micro-libraries and realizing function calls and communications between static micro-libraries and dynamic micro-libraries and function calls and communications between different dynamic micro-libraries.

In some embodiments, in order to further enhance the flexibility and responsiveness of the system, the dynamic updater also supports customized dynamic updating of the micro-libraries, ensuring that the dynamic loading and unloading process of the micro-libraries does not affect the normal operation of the upper layer application. During implementation, the use system of the dynamic updater interrupts. The dynamic updater can also perform a stack check before updating a micro-libraries function to ensure that the micro-libraries function call has ended before it is updated, thus enabling micro-libraries updates and optimization without interrupting the generative operating system.

In some embodiments, in response to a change of at least one of the system resources (also referred to as hardware resources or a hardware environment), the micro-libraries version, and the application requirements, the run optimizer generates a plurality of candidate update parameters based on the changed system resources, the changed micro-libraries version, and the changed application requirements via the intelligent runtime sensor; evaluates, via a system optimization model, a fitness value corresponding to each of the plurality of candidate update parameters; and determines a candidate update parameter that satisfy a fitness condition as a target update parameter, and generate the micro-libraries update instruction based on the target update parameter.

The candidate update parameters refer to a micro-libraries update parameters to be determined. The candidate update parameters may also be referred to as the dynamic updated proposals.

In some embodiments, the run optimizer determines a plurality of optional micro-libraries update parameters for different micro-libraries by a manner of generating the micro-libraries update parameters based on the changed hardware environment based on at least one of the changed system resources, the changed micro-libraries version, and the changed application requirements, and a manner of determining the micro-libraries update parameters based on the new application data, the associated software data, and the associated hardware data. The run optimizer permutates and combines the optional micro-libraries versions of the plurality of micro-libraries to obtain the plurality of candidate update parameters.

The optional micro-libraries versions refer to all versions of the micro-libraries that may be configured on the generative operating system. Exemplarily, optional micro-libraries versions for a micro-library type A are VA1, VA2, and VA3, and optional micro-libraries versions for a micro-library type B are VB1, VB2, VB3, and VB4, and then the run optimizer may combine the optional micro-libraries versions of type A and the optional micro-libraries versions of micro-library type B in an arbitrary pairing to obtain the plurality of candidate update parameters.

The system optimization model refers to a model used to evaluate the fitness value of the candidate update parameters. In some embodiments, the system optimization model is any one or a combination of machine learning models, e.g., Deep Neural Network (DNN), or other customized model structures.

In some embodiments, inputs of the system optimization model include at least one of the candidate update parameters, the changed system resources, the changed micro-libraries version, and the changed application requirement, and outputs of the system optimization model is fitness values of the candidate update parameters. The fitness value refers to data used to feature applicability of the candidate update parameters under the current system resources.

In some embodiments, the run optimizer trains the system optimization model based on a large number of second training samples with a second label by training system such as gradient descent. In some embodiments, the second training sample includes sample system resources, a sample micro-libraries version, a sample application requirement, and sample candidate update parameters of a sample generative operating system, and the second label includes actual fitness values corresponding to the sample candidate update parameters. The second training sample is obtained based on historical data.

In some embodiments, the second label is determined based on a resource occupancy status, a count of crashes, and operational responsiveness. For example, after the sample generative operating system performs a dynamic update of the micro-libraries based on the sample candidate update parameters, the actual fitness values corresponding to the sample candidate update parameters are determined based on the resource occupancy status of a plurality of upper layer applications, the count of crashes, and the operational responsiveness. The fitness values are negatively correlated to the resource occupancy status and the count of crashes, and positively correlated to the operational responsiveness. More descriptions regarding the resource occupancy status may be found in FIG. 4 and relevant descriptions thereof.

The training process of the system optimization model is similar to that of the prediction model, more descriptions of the training process of the prediction model can be found previously.

The target update parameter refers to a defined micro-libraries update parameter. In some embodiments, the target update parameter also includes the micro-libraries update time. More descriptions regarding the micro-libraries update time may be found in FIG. 4 and relevant descriptions thereof.

In some embodiments, the run optimizer determines the target update parameter in a plurality of manners. For example, the run optimizer identifies candidate update parameters whose fitness value satisfies a fitness condition as the target update parameter. The micro-libraries update time in the target update parameter is determined by determining the micro-libraries update time as described above. The fitness condition includes maximum fitness value, or the like.

In some embodiments, the run optimizer may also determine a plurality of simulation information based on the plurality of candidate update parameters. Through an embedded virtual device, a plurality of virtual processes are launched based on the plurality of simulation information, the embedded virtual device runs a virtual task and evaluates system operational data corresponding to the plurality of candidate update parameters, respectively, based on the plurality of candidate update parameters and the plurality of virtual processes. The run optimizer determines the target update parameter based on the system runtime data and the fitness value corresponding to each candidate update parameter.

The simulation information refers to information used to instruct the embedded virtual device to emulate the generative operating system. In some embodiments, the simulation information includes configuration parameters related to the candidate update parameters, the changed system resources, the changed micro-libraries versions, and the changed application requirements. Each candidate update parameter corresponds to a piece of simulation information.

In some embodiments, the run optimizer integrates candidate update parameters with data on system resources, the micro-library version, and application requirements determined after the changes to the candidate update parameters, and automatically sets configuration parameters of the embedded virtual device based on the integrated data, thereby obtaining the simulation information.

The embedded virtual device is used to simulate hardware and software information of devices equipped with the generative operating system, which in turn generates the virtual generative operating system.

The virtual process refers to a process that runs on the virtual generative operating system. In some embodiments, the embedded virtual device launches, after simulating to obtain the virtual generative operating system based on single simulation information among a plurality of pieces of simulation information, the plurality of virtual processes corresponding to the virtual application in the virtual generative operating system. One piece of simulation information corresponds to a virtual generative operating system. A virtual generative operating system corresponds to a plurality of virtual processes.

The virtual task refers to a virtual generative operating system running the virtual application. In some embodiments, after the embedded virtual device loads a plurality of micro-libraries in a corresponding candidate update parameter in the virtual generative operating system, the virtual generative operating system runs a plurality of virtual processes corresponding to the virtual applications which in turn perform the virtual task.

The system runtime data refers to data related to execution of the virtual task by the virtual generative operating system. In some embodiments, the system runtime data includes a resource occupancy status, a count of crashes, and an operation response rate corresponding to the virtual generative operating system.

In some embodiments, the run optimizer determines a virtual fitness value corresponding to the virtual generative operating system based on the system runtime data by the manner of determining the actual fitness value described above. The virtual fitness value corresponding to the virtual generative operating system is a virtual fitness corresponding to the candidate update parameter.

In some embodiments, the run optimizer obtains a composite fitness value corresponding to the candidate update parameter by performing a weighted summation of the virtual fitness values and the fitness values corresponding to the candidate update parameters. The composite fitness value corresponding to each candidate update parameter is obtained by the above manner.

In some embodiments, the run optimizer uses a candidate update parameter with a highest composite fitness value as the target update parameter. The micro-libraries update time in the target update parameter is determined by the manner described above for determining the micro-libraries update time.

By running a plurality of virtual tasks corresponding to the candidate update parameters in the virtual environment, an operation condition of the actual generative operating system can be more realistically emulated to ensure that the target update parameter can run stably in the actual environment.

Evaluating the fitness values of the candidate update parameters through the system optimization model and determining the optimal target updated proposal based on the fitness value quickly ensure that the generative operating system completes the necessary adjustment in the shortest possible time, thereby ensuring the normal operation of the upper layer application of the generative operating system.

In some embodiments, the run optimizer generates the micro-libraries update instruction based on the target update parameter in the same manner as the manner of generating the micro-libraries update instruction described above, which is implemented as described above in the manner of generating the micro-libraries update instruction.

Based on the same inventive conception, embodiments of the present disclosure also provide a generative operating system generation device for realizing a method for generating the generative operating system. The realization of the problem-solving provided by the device is similar to the realization documented in the above method, and therefore the specific limitations in the one or more embodiments of the generative operating system generating device provided hereinafter can be seen in the above limitations of the generative operating system generating method and will not be repeated herein.

Figure 7:
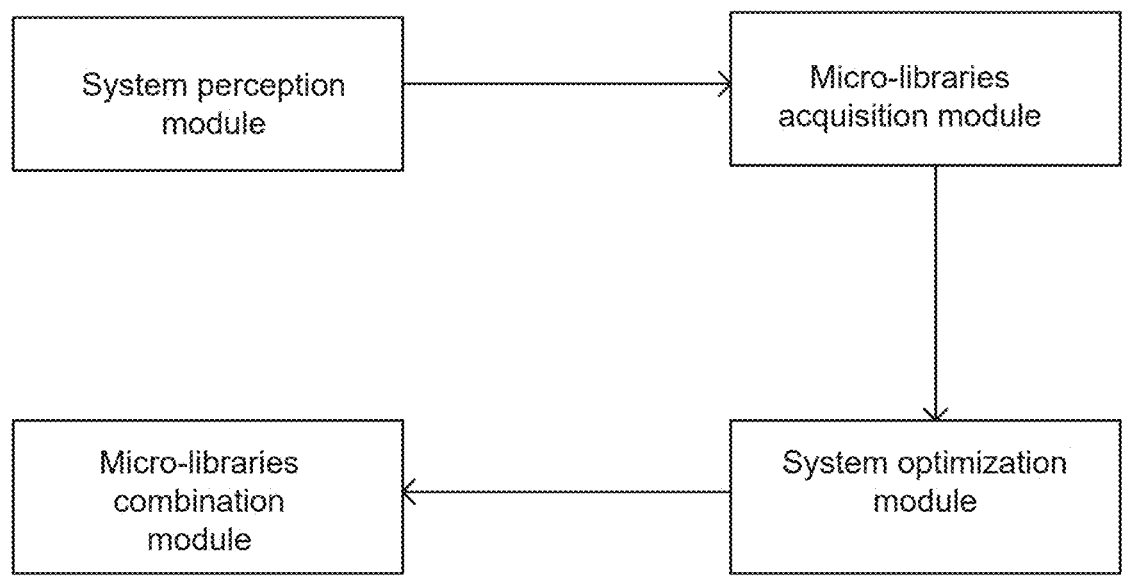
FIG. 7 is a schematic diagram illustrating an architecture of a generative operating system generation device according to an embodiment of the present disclosure.

FIG. 7 is a schematic diagram illustrating an architecture of a generative operating system generation device according to an embodiment of the present disclosure.

In one embodiment, as shown in FIG. 7, a generative operating system generating device includes a system perception module, micro-libraries acquisition module, micro-libraries combination module, and system optimization module.

In some embodiments, the system perception module is configured to systematically and comprehensively perceive an environment state and application requirements by an environment sensor and generate a configuration file.

In some embodiments, the micro-libraries acquisition module is configured to parse the corresponding micro-libraries through the configuration files and obtain a corresponding micro-libraries collection through a micro-library marketplace.

In some embodiments, the micro-libraries combination module is configured to assemble configured micro-libraries into the generative operating system by a system organizer.

In some embodiments, the system optimization module is configured for dynamically adjusting and optimizing the generative operating system in real time by a run optimizer based on changes in a runtime environment and operational requirements.

In some embodiments, the system perception module, the micro-libraries acquisition module, the micro-libraries combination module, and the system optimization module may be integrated into the processor.

Figure 8:
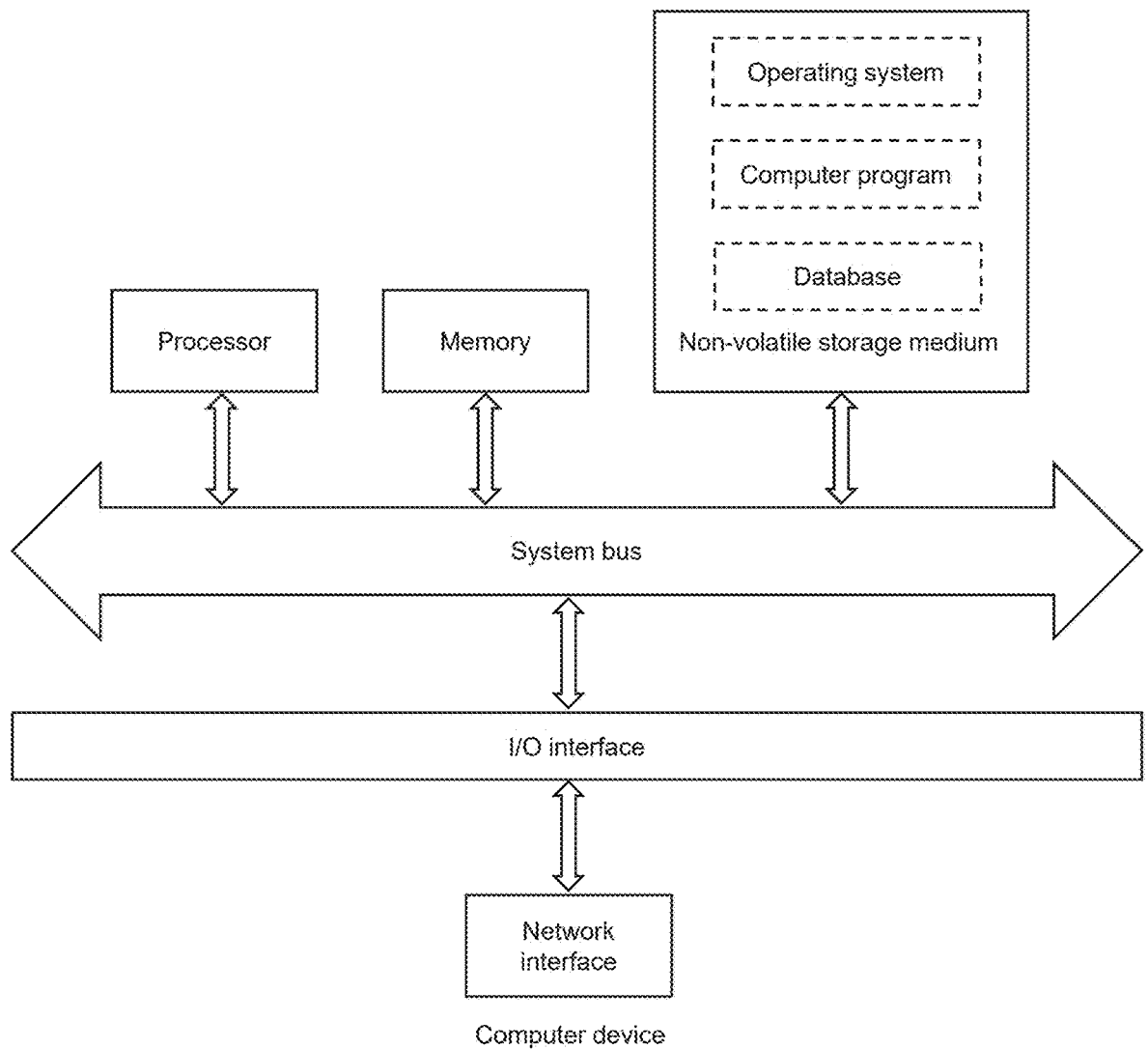
FIG. 8 is a schematic diagram illustrating an internal structure of a computer device according to an embodiment of the present disclosure.

FIG. 8 is a schematic diagram illustrating an internal structure of a computer device according to an embodiment of the present disclosure.

Embodiments of the present disclosure provide a computer device, which may be a server, and an internal structure diagram of which may be shown in FIG. 8. The computer device includes a processor, a memory, and a network interface connected via a system bus. The processor of the computer device is used to provide computing and control capabilities. The memory of the computer device includes a non-volatile storage medium and an internal memory. The non-volatile storage medium stores an operating system, a computer program, and a database. The internal memory provides an environment for the operation of the operating system and the computer program in the non-volatile storage medium. The database of the computer device is used to store generated data of the generative operating system. The network interface of the computer device is used to communicate with an external terminal via a network connection. The computer program is executed by the processor to implement the generative operating system generation method described in the embodiments of this disclosure.

It will be understood by those skilled in the art that the structure illustrated in FIG. 8, which is only a block diagram of a portion of the structure related to the embodiments of the present disclosure, does not constitute a limitation on the computer equipment to which the embodiments of the present disclosure are applied, specifically the computer equipment may include more or fewer components than shown in the drawings, or combine certain components, or have a different arrangement of components.

Embodiments of the present disclosure provide a computer device comprising a memory and a processor, the memory storing a computer program, and the computer program being executed by the processor causing the processor to perform the operations of a generative operating system generation method described in the above-described embodiments. The operations of a method of generating the generative operating system herein may be the operations in the method of generating a generative operating system of the various embodiments described above.

Embodiments of the present disclosure provide a computer-readable storage medium storing a computer program, the computer program being executed by a processor such that the processor performs the operations of a generative operating system generation method described in the above embodiments.

Embodiments of the present disclosure provide a computer program product comprising a computer program, the computer program, when executed by a processor, causing the processor to perform the operations of a generative operating system generation method described in the above-described embodiments.

The generative operating system provided by the embodiments of this disclosure is intended to overcome limitations of a traditional static pre-developed operating system, and to provide a new operating system solution that is self-aware, self-organizing, and self-optimizing to meet diverse and dynamic needs of a new generation of intelligent computing environment. The generative operating system provided by the embodiments of the present disclosure is unique in that it is highly adaptive and dynamic in its architectural design, which supports the automation of the entire process of the operating system, from the perception of the environment to the acquisition of resources, the organization of the system, and even the operation optimization. The biggest advantage is the ability to quickly generate and optimize proprietary operating system for different application proposals and hardware environments, enabling flexible adaptation and adaptive optimization of hardware and software environment. This architecture not only improves the flexibility and performance of the operating system but also greatly enhances the user experience and system adaptability. This architecture not only flexibly responds to changing application requirements and hardware environments but also ensures efficient operation and optimized management of the operating system throughout its lifecycle.

In addition, it should be noted that, in this disclosure, the terms "including," "comprising," or any of its other variations thereof are intended to cover non-exclusive inclusion, such that a process, method, article, or apparatus that includes a set of elements includes not only those elements but also other elements that are not explicitly listed, or that are inherent to such a process, method, article, or apparatus. In the absence of further limitation, the elements limited by the statement "including a . . . " do not preclude the existence of another identical element in the process, method, article, or device that includes said element.

It should be understood that, although the present disclosure is described in accordance with the embodiments, not each embodiment comprises only one independent technical solution, and the disclosure is recited in such a manner only for the sake of clarity, and a person skilled in the art should treat the disclosure as a whole, the technical solutions in each embodiment can also be combined appropriately to form other embodiments that can be understood by those skilled in the art.

What is claimed is:

1. A method for dynamically generating a generative operating system based on a hardware and software environment feature, the method being configured to generate the generative operating system, wherein an architecture of the generative operating system includes: a hardware architecture adaptation layer and a meta kernel layer and external libraries of the operating system;
   the hardware architecture adaptation layer is configured to access a hardware and sense a feature of the hardware, and provide lifecycle management and hardware abstraction management to the meta kernel layer of the operating system;
   the meta kernel layer of the operating system is configured to realize a basic operating framework of the operating system, wherein the metal kernel layer includes a dynamic combination framework of micro-libraries and a dynamic updating architecture of the micro-libraries;
   the external libraries are micro-libraries implementations of functions required by the operating system other than the meta kernel layer, wherein the external libraries include programming language micro-libraries for supporting multiple languages and system management libraries for implementing various types of management strategies;
   the method comprises:
   first, systematically and comprehensively perceiving an environment state and application requirements by an environment sensor and generating a configuration file; wherein the configuration files include required micro-libraries; the micro-libraries are micro-platforms that realize functions required by the generative operating system;
   secondly, parsing the required micro-libraries through the configuration files and obtaining a required micro-libraries collection through a micro-library marketplace;
   subsequently, assembling configured micro-libraries into the generative operating system by a system organizer;
   finally, dynamically adjusting and optimizing the generative operating system in real time by a run optimizer based on changes in a runtime environment and operational requirements;
   wherein the run optimizer focuses on performance optimization of runtime adaptation of the generative operating system, by sensing an upper layer application and a system self-update instruction based on a system scan period through the environment sensor, a system configuration, dynamic updating of a micro-libraries version of the generative operating system, and runtime dynamic optimization of the generative operating system is achieved, wherein the method further comprises:
   determining, via the run optimizer, micro-libraries update parameters based on the upper layer application, the system self-update instruction, and system runtime state, and
   generating, via the run optimizer, a micro-libraries update instruction based on the micro-libraries update parameters to perform dynamic loading and unloading of the micro-libraries of the generative operating system; wherein the system scan period is a time interval at which the generative operating system periodically scans itself; the micro-libraries update parameters further include micro-libraries update time; wherein the method further comprises:
   determining, via the run optimizer, a future usage feature based on a system usage feature,
   determining, via the run optimizer, the future usage feature through a predictive model, and determining, via the run optimizer, the micro-libraries update time based on the future usage feature and a resource occupancy status; wherein the micro-libraries update time refers to a specific time point for updating the micro-libraries; the future usage feature refers to a system use feature in a future period; the resource occupancy status includes an amount of computing resources for different upper layer applications or functions; the amount of compute resources is expressed as a ratio of compute resources used to total compute resources; the predictive model is a Long Short-Term Memory (LSTM) networks;

the run optimizer includes an intelligent runtime sensor and a dynamic updater, wherein the intelligent runtime sensor monitors the micro-libraries through the generative operating system, captures a runtime state of the generative operating system in real time, and automatically performs system configuration tuning and micro-libraries updates in response to a change of the system configuration and requirements for performance optimization; the dynamic updater is configured for adaptive real-time compilation and dynamic updating of the micro-libraries within the generative operating system, and a dynamic update mechanism allows the intelligent runtime sensor to dynamically load or unload the micro-libraries according to changing requirements.

2. The method for dynamically generating the generative operating system based on the hardware and software environment feature of claim 1, wherein the intelligent runtime sensor includes a system operation monitoring module $M_{res}$ configured to receive and process an operation condition $R_{guest}$ sent by a built-in monitoring module of the generative operating system in operation and monitor an external hardware and software environment condition $R_{host}$.

3. The method for dynamically generating the generative operating system based on the hardware and software environment feature of claim 2, wherein the intelligent runtime sensor further includes responding to the change of the system configuration and requirements for the micro-libraries updates;

when system resources $R_{sys}(R_{guest}, R_{host})$, a micro-librares version $V_{lib}$ and application requirements $D_{app}$ are changed, the intelligent runtime sensor performs following operations:

first, proposing a plurality of dynamic updated proposals $U_{proposal}$; and subsequently, the intelligent runtime sensor combines a resources condition of the system environment to achieve a quantitative comparison between an existing running proposal and the plurality of updated proposal $U_{proposal}$ by an optimization function $F_{opt}$, and selects a best dynamic updated proposal to be handed over to the dynamic updater for dynamic updating of the resources.

4. The method for dynamically generating the generative operating system based on the hardware and software environment feature of claim 3, wherein the optimization function $F_{opt}$ is denoted by:

$$F_{opt} = \mathrm{argmax}_{U \in U_{proposal}} f(R_{sys}, V_{lib}, D_{app}, U)$$

wherein f is an evaluation function for evaluating the resource condition $R_{sys}$, the micro-libraries version $V_{lib}$, the application requirements $D_{app}$, and a fitness of the updated proposals U.

5. The method for dynamically generating the generative operating system based on the hardware and software environment feature of claim 3, wherein the method further includes:

in response to a change of at least one of the system resources, the micro-libraries version, and the application requirements, generating a plurality of candidate update parameters based on the changed system resources, the changed micro-libraries version, and the changed application requirements via the intelligent runtime sensor;

evaluating, via a system optimization model, a fitness value corresponding to each of the plurality of the candidate update parameters; and determining a candidate update parameter that satisfies a fitness condition as a target update parameter, and generating the micro-libraries update instruction based on the target update parameter, the system optimization model being a machine learning model.

6. The method for dynamically generating the generative operating system based on the hardware and software environment feature of claim 5, wherein the method further includes:

determining a plurality of simulation information based on the plurality of the candidate update parameters;

launching a plurality of virtual processes based on the plurality of simulation information through an embedded virtual device, wherein the simulation information refers to information used to instruct the embedded virtual device to emulate the generative operating system;

running a virtual task and evaluates system operational data corresponding to the plurality of the candidate update parameters, respectively, based on the plurality of the candidate update parameters and the plurality of virtual processes; wherein a virtual process refers to a process that runs on a virtual generative operating system;

determining the target update parameter based on system runtime data and the fitness value corresponding to each of the plurality of candidate update parameters.

7. The method for dynamically generating the generative operating system based on the hardware and software environment feature of claim 5, wherein the method further includes:

training the system optimization model based on a large number of second training samples with second labels by gradient descent, the second training samples include sample system resources, a sample micro-libraries version, a sample application requirement, and sample candidate update parameters of a sample generative operating system, and the second labels include actual fitness values corresponding to the sample candidate update parameters, the second training samples are obtained based on historical data; wherein the system optimization model is obtained by a training process comprising:

inputting a plurality of second training samples with the second labels into an initial system optimization model, constructing a loss function by the second label and a result of the initial system optimization model, iteratively updating parameters of the initial system optimization model based on a value of the loss function;

completing the training process when the loss function of the initial system optimization model satisfies a preset condition, and obtaining the trained system optimization model; wherein the preset condition includes the loss function converging, or a count of iterations reaching a threshold.

8. The method for dynamically generating the generative operating system based on the hardware and software environment feature of claim 2, wherein the dynamic updater is further configured for managing the micro-libraries and realizing function calls and communications between static micro-libraries and dynamic micro-libraries and function calls and communications between different dynamic micro-libraries.

9. The method for dynamically generating the generative operating system based on the hardware and software environment feature of claim 8, wherein the dynamic updater also supports customized dynamic updating of the micro-libraries, ensuring a dynamic loading and unloading process of the micro-libraries does not affect a normal operation of the upper layer application.

10. The method for dynamically generating the generative operating system based on the hardware and software environment feature of claim 1, wherein the determining micro-libraries update parameters further includes:
constructing a first matching vector based on at least one of a changed upper layer application, the system self-update instruction, and the system runtime state, and retrieving, based on the first matching vector, a first target vector in first vector database that satisfies a first matching condition; and
determining the micro-libraries update parameters based on micro-libraries parameters corresponding to the retrieved first target vector; wherein the first matching condition includes having a highest vector similarity to the first matching vector; a vector similarity is negatively correlated to a vector distance; the vector distance includes a euclidean distance; the first vector database is preset based on historical running record and includes a plurality of first target vectors and micro-libraries parameters corresponding to different first target vectors; the first target vector refers to a feature vector constructed based on at least one of a historical upper layer application, historical update instruction, and historical system runtime state; the historical update instruction is a system self-update instruction in historical data.

11. The method for dynamically generating the generative operating system based on the hardware and software environment feature of claim 1, wherein the method further includes:
determining the system scan period based on a frequency of error reporting and an application runtime feature of the generative operating system when it runs the upper layer application; wherein the frequency of error reporting is used to feature a frequency with which the generative operating system runs into errors; the application runtime feature includes an average runtime of a plurality of upper layer applications.

12. The method for dynamically generating the generative operating system based on the hardware and software environment feature of claim 11, wherein
the system scan period negatively correlates with the frequency of error reporting and positively correlates with the application runtime feature.

13. The method for dynamically generating the generative operating system based on the hardware and software environment feature of claim 1, wherein the method further includes:

training the predictive model based on a large number of first training samples with first labels by gradient descent; wherein the first training samples include a sample system usage feature sequence over a first historical period; the first labels include a system usage feature within a second historical period; the first historical period precedes the second historical period; the first training samples and the first labels are obtained based on historical run record; the predictive model is obtained by a training process includes:
inputting the plurality of first training samples with the first labels into an initial predictive model,
constructing a loss function by the first labels and a result of the initial predictive model, and
iteratively updating parameters of the initial predictive model based on a value of the loss function; wherein the training process is completed when the loss function of the initial predictive model satisfies a preset condition, and the trained predictive model is obtained; the preset condition includes the loss function converging or a count of iterations reaching a threshold.

14. The method for dynamically generating the generative operating system based on the hardware and software environment feature of claim 1, wherein different function modules correspond to micro-libraries with different micro-libraries update times; the method further includes:
for micro-libraries corresponding to the different functional modules, determining, based on a plurality of sub-periods of time, a sub-period of time that satisfies an update condition as micro-libraries update time for the micro-library corresponding to the functional modules; wherein the update condition includes that no associated applications are running and total running load is less than a load threshold; an associated application refers to an upper layer application that requires one or more micro-libraries to perform some or all of its functions during its operation and use.

15. The method for dynamically generating the generative operating system based on the hardware and software environment feature of claim 1, wherein the method further includes:
in response to the generative operating system receiving new application data, parsing the new application data to determine associated software data and associated hardware data corresponding to a new application, wherein the new application data refers to data associated with the new application; the new application refers to an application newly configured on the generative operating system; determining, via the run optimizer, the micro-libraries update parameters based on the new application data, the associated software data, and the associated hardware data.

16. The method for dynamically generating the generative operating system based on the hardware and software environment feature of claim 11, wherein the method further includes:
constructing a second matching vector based on the new application data, the associated software data, and the associated hardware data, searching in a second vector database using the second matching vector to obtain a second target vector that satisfies a second matching condition, and
determining historical micro-libraries update parameters corresponding to the second target vector as the micro-libraries update parameters; wherein the second target vector refers to a feature vector constructed based on historical application data, historical associated software data, and historical associated hardware data; the new application data includes an installation package, a name, a type, a developer, and use of the new application; the associated software data refers to one or more functional modules that correspond to the new application, the associated hardware data refers to data related to hardware resources required for the new application.

17. The method for dynamically generating the generative operating system based on the hardware and software environment feature of claim 11, wherein the method further includes:
in response to recognizing a changed hardware environment via a hardware sensor in the environment sensor, generating the micro-libraries update parameters based on the changed hardware environment.

18. The method for dynamically generating the generative operating system based on the hardware and software environment feature of claim 13, wherein the method further includes:
looking up a set of adapted micro-libraries corresponding to the changed hardware environment in a matching table based on the changed hardware environment;
in response to a version of a current micro-library not being included in the set of adapted micro-libraries,
selecting a latest version of the current micro-library from the set of adapted micro-libraries as a new micro-library that needs to be loaded, and
selecting the current micro-library as an old micro-library that needs to be uninstalled to determine the micro-libraries update parameters;
wherein the matching table is constructed based on extensive testing and user data, and the matching table includes a set of adapted micro-libraries that match different hardware environments;
the set of adapted micro-libraries includes a plurality of versions respectively corresponding to a plurality of micro-libraries.

\* \* \* \* \*